US011685386B2

(12) United States Patent
Kawashima

(10) Patent No.: US 11,685,386 B2
(45) Date of Patent: Jun. 27, 2023

(54) SYSTEM AND METHOD FOR DETERMINING A CHANGE OF A CUSTOMARY VEHICLE DRIVER

(71) Applicant: Honda Motor Co., Ltd., Tokyo (JP)

(72) Inventor: Kiyotaka Kawashima, Los Angeles, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 141 days.

(21) Appl. No.: 16/207,320

(22) Filed: Dec. 3, 2018

(65) Prior Publication Data
US 2020/0172112 A1 Jun. 4, 2020

(51) Int. Cl.
B60W 40/09 (2012.01)
B60W 50/08 (2020.01)
G06Q 30/02 (2023.01)
B60W 40/08 (2012.01)

(52) U.S. Cl.
CPC ........... B60W 40/09 (2013.01); B60W 50/08 (2013.01); G06Q 30/0278 (2013.01); *B60W 2040/0809* (2013.01); *B60W 2540/043* (2020.02)

(58) Field of Classification Search
CPC ... B60W 40/08–09; B60W 2040/0809; B60W 2540/0413; B60W 2540/043–045; B60W 2540/30; B60W 50/08–16; G06Q 30/00; G06Q 30/02–04; G06Q 30/0283–0284; G06Q 30/0278; G06Q 40/08; G05D 1/00; G07C 5/00

USPC .................................. 701/36–49; 705/306
See application file for complete search history.

(56) References Cited

U.S. PATENT DOCUMENTS

| 8,600,823 | B1* | 12/2013 | Raines | G06Q 30/02 |
| | | | | 705/26.1 |
| 9,141,995 | B1* | 9/2015 | Brinkmann | G07C 5/008 |
| 9,697,544 | B1* | 7/2017 | Bayer | G06Q 30/0278 |
| 9,764,742 | B1* | 9/2017 | Goldfarb | B60W 40/09 |
| 9,995,584 | B1* | 6/2018 | Kanevsky | G01C 21/14 |
| 10,528,989 | B1* | 1/2020 | Irey | G07C 5/08 |
| 10,755,566 | B2* | 8/2020 | Tennent | B60W 40/09 |
| 2011/0082616 | A1* | 4/2011 | Small | G01C 21/3664 |
| | | | | 715/744 |
| 2011/0251734 | A1* | 10/2011 | Schepp | B60W 40/09 |
| | | | | 701/1 |
| 2012/0221170 | A1* | 8/2012 | Tanoue | G09B 19/167 |
| | | | | 701/1 |

(Continued)

Primary Examiner — Jeffrey C Boomer
Assistant Examiner — Paul Allen
(74) Attorney, Agent, or Firm — Rankin, Hill & Clark LLP

(57) ABSTRACT

A system and method for determining a change of a customary vehicle driver that include receiving and storing vehicle sensor data from a vehicle for at least one predetermined period of time. The system and method also include determining a vehicle driving pattern for the at least one predetermined period of time based on the vehicle sensor data and determining if there is a change in the customary vehicle driver based on a comparison of a real-time vehicle sensor data with the vehicle driving pattern. The system and method further include controlling at least one vehicle system by executing vehicle settings associated with at least one of: the customary vehicle driver and a newly designated customary vehicle driver based on if the change is determined in the customary vehicle driver.

20 Claims, 6 Drawing Sheets

(56) References Cited

U.S. PATENT DOCUMENTS

| | | | |
|---|---|---|---|
| 2012/0303474 A1* | 11/2012 | Sanel | G06Q 30/08 705/26.4 |
| 2013/0102283 A1* | 4/2013 | Lau | G06Q 30/0269 455/411 |
| 2013/0344856 A1* | 12/2013 | Silver | G06N 20/00 455/418 |
| 2014/0236472 A1* | 8/2014 | Rosario | G08G 1/096741 701/400 |
| 2014/0309864 A1* | 10/2014 | Ricci | G01C 21/365 701/36 |
| 2015/0191178 A1* | 7/2015 | Roy | H04W 4/027 701/36 |
| 2015/0213519 A1* | 7/2015 | Krishnamurthy | G07C 5/008 705/35 |
| 2015/0235485 A1* | 8/2015 | Nemat-Nasser | B60W 40/09 701/1 |
| 2016/0125673 A1* | 5/2016 | Bromham | G07C 5/08 701/115 |
| 2016/0375908 A1* | 12/2016 | Biemer | G07C 5/008 701/1 |
| 2017/0032400 A1* | 2/2017 | Gilmore | G06Q 30/0206 |
| 2017/0309092 A1* | 10/2017 | Rosenbaum | G01M 17/007 |
| 2017/0337573 A1* | 11/2017 | Toprak | G07C 5/006 |
| 2018/0204119 A1* | 7/2018 | Anderson | G06N 3/0454 |
| 2018/0330417 A1* | 11/2018 | Wollmer | G06Q 30/0619 |
| 2018/0359445 A1* | 12/2018 | Liao | G16H 40/67 |
| 2018/0361995 A1* | 12/2018 | Basir | G06Q 30/0206 |
| 2019/0009788 A1* | 1/2019 | Phillips | B60R 16/037 |
| 2019/0073701 A1* | 3/2019 | Sonnad | G07C 5/08 |
| 2019/0332915 A1* | 10/2019 | Devdutt | H04N 21/41422 |
| 2019/0389483 A1* | 12/2019 | Likhterman | G06Q 30/02 705/26.1 |
| 2020/0013030 A1* | 1/2020 | Shneider | G06Q 30/0283 |
| 2020/0027141 A1* | 1/2020 | Tompkins | G06Q 30/0206 |
| 2020/0160407 A1* | 5/2020 | Osumi | G06Q 30/0278 |
| 2021/0133808 A1* | 5/2021 | Chan | B60W 40/09 |
| 2021/0334865 A1* | 10/2021 | Irey | G06Q 30/0283 |

* cited by examiner

US 11,685,386 B2

SYSTEM AND METHOD FOR DETERMINING A CHANGE OF A CUSTOMARY VEHICLE DRIVER

BACKGROUND

In many cases, entities such as vehicle manufacturers (OEMs) and/or third-party entities (e.g., third-party warranty company, insurance company) may utilize information pertaining to an ownership and/or a driver of a vehicle to keep track of warranty related customer information, provide recall information, to keep track of a vehicle residual value, to keep track of vehicle incidents (e.g., accident history), and the like. Currently, when vehicle ownership changes and/or driver changes are completed, the OEMs and/or third-party entities may not be made aware of the vehicle ownership changes and/or driver changes unless such an update regarding the change in ownership of the vehicle and/or the change of a vehicle driver is manually provided.

In many cases, manually providing such information to the OEMs and/or third-party entities is a tedious process from a customer's perspective and from the perspective of the OEMs and/or third-party entities since customers may not provide data pertaining to the change until after a significant amount of time has passed from the change in ownership or driver. Accordingly, data associated with ownership and/or driver information pertaining to the vehicle may be inaccurate for a period of time and may result in capturing of skewed data pertaining to the warranty related customer information, tracking of vehicle residual value, and/or vehicle incident tracking. Furthermore, inaccurate data pertaining to the ownership and/or driver information pertaining to the vehicle may slow down reporting of recall information to a current owner and/or current driver of the vehicle.

BRIEF DESCRIPTION

According to one aspect, a computer-implemented method for determining a change of a customary vehicle driver that includes receiving and storing vehicle sensor data from a vehicle for at least one predetermined period of time and determining a vehicle driving pattern for the at least one predetermined period of time based on the vehicle sensor data. The customary vehicle driver is determined based on the vehicle driving pattern. The computer-implemented method also includes determining if there is a change in the customary vehicle driver based on a comparison of a real-time vehicle sensor data with the vehicle driving pattern. A different driver than the customary vehicle driver is designated as a newly designated customary vehicle driver if the change is determined. The computer-implemented method further includes controlling at least one vehicle system by executing vehicle settings associated with at least one of: the customary vehicle driver and the newly designated customary vehicle driver based on if the change is determined in the customary vehicle driver.

According to another aspect, a system for determining a change of a customary vehicle driver that includes a memory storing instructions when executed by a processor cause the processor to receive and store vehicle sensor data from a vehicle for at least one predetermined period of time and determine a vehicle driving pattern for the at least one predetermined period of time based on the vehicle sensor data. The customary vehicle driver is determined based on the vehicle driving pattern. The instructions also cause the processor to determine if there is a change in the customary vehicle driver based on a comparison of a real-time vehicle sensor data with the vehicle driving pattern. A different driver than the customary vehicle driver is designated as a newly designated customary vehicle driver if the change is determined. The instructions further cause the processor to control at least one vehicle system by executing vehicle settings associated with at least one of: the customary vehicle driver and the newly designated customary vehicle driver based on if the change is determined in the customary vehicle driver.

According to still another aspect, a non-transitory computer readable storage medium storing instructions that when executed by a computer, which includes a processor perform a method that includes receiving and storing vehicle sensor data from a vehicle for at least one predetermined period of time and determining a vehicle driving pattern for the at least one predetermined period of time based on the vehicle sensor data. A customary vehicle driver is determined based on the vehicle driving pattern. The method also includes determining if there is a change in the customary vehicle driver based on a comparison of a real-time vehicle sensor data with the vehicle driving pattern. A different driver than the customary vehicle driver is designated as a newly designated customary vehicle driver if the change is determined. The method further includes controlling at least one vehicle system by executing vehicle settings associated with at least one of: the customary vehicle driver and the newly designated customary vehicle driver based on if the change is determined in the customary vehicle driver.

DETAILED DESCRIPTION

Figure 1:
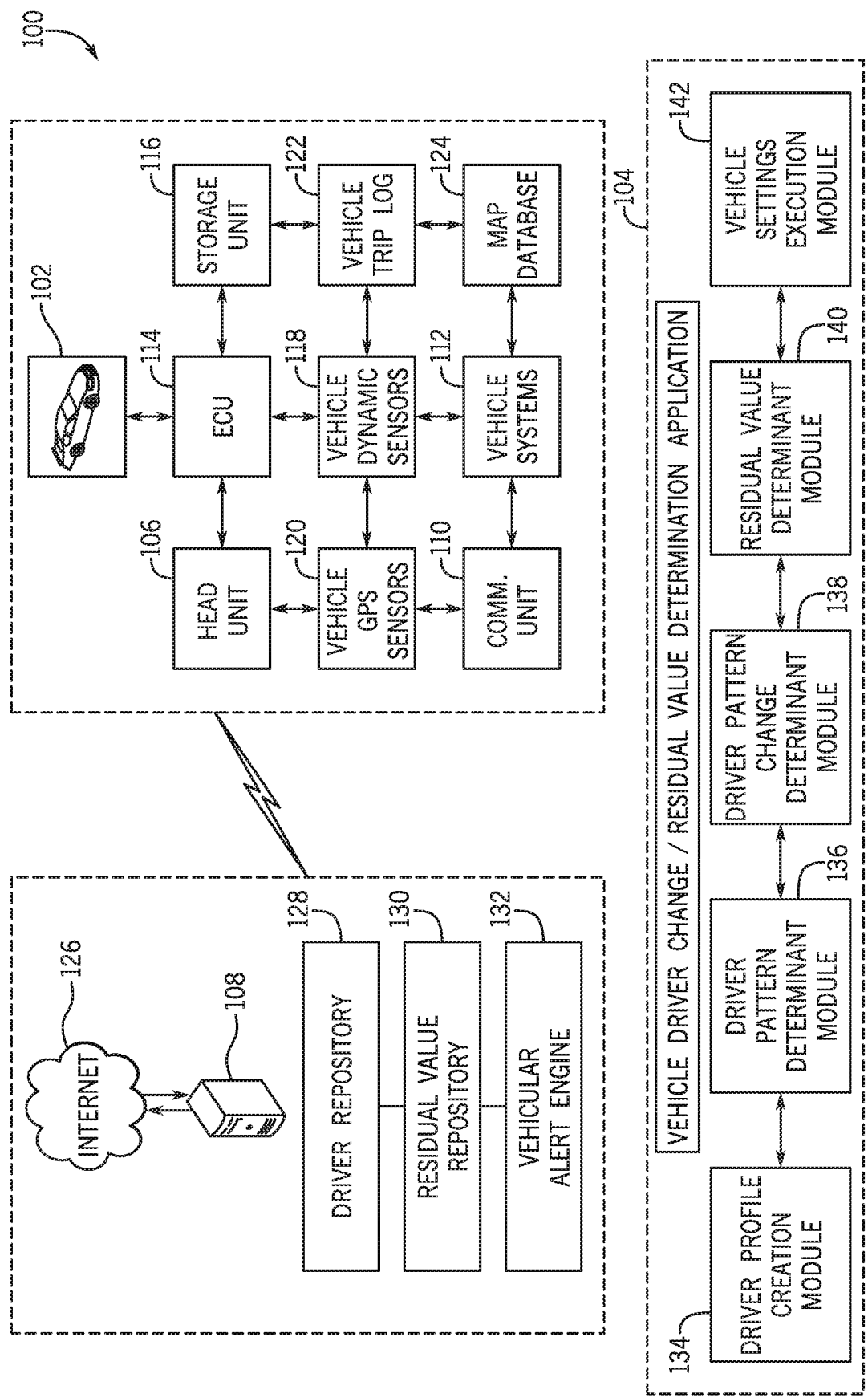
FIG. 1 is a schematic view of an operating environment for implementing systems and methods for determining a change of a customary vehicle driver according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle sensors", as used herein may include, but is not limited to, electric current/potential (e.g., proximity sensors, inductive, capacitive), ultrasonic (e.g., piezoelectric, electrostatic), vibration, optical, vision, photoelectric or oxygen sensors, among others.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for implementing systems and methods for determining a change of a customary vehicle driver according to an exemplary embodiment of the present disclosure. The components of the environment 100, as well as the components of other systems, hardware architectures, and software architectures discussed herein, may be combined, omitted, or organized into different architectures for various embodiments.

Generally, the environment 100 may include a vehicle 102 that includes a plurality of components that execute a vehicle driver change/residual value determination application 104 (driver/value determination application). As described in more detail below, the driver/value determination application 104 may be executed on a head unit 106 of the vehicle 102, and/or an external server infrastructure 108 (external server) that may be accessed by a vehicle communication system 110 (communication system).

As discussed in more detail below, in one embodiment, the driver/value determination application 104 may be executed to determine a customary driver of the vehicle 102 (customary vehicle driver) and to further determined if and when the customary vehicle driver has changed from one driver to another. For example, a customary vehicle driver may include a driver who regularly and customarily drives the vehicle 102 and may include an owner, a long-term driver, and/or a short-term driver of the vehicle 102 for one or more periods of time (that may drive the vehicle 102 on a regular/semi-regular basis).

The driver/value determination application 104 may be utilized to determine driver patterns over one or more periods of time of use of the vehicle 102. The driver patterns may be evaluated by the application 104 to determine changes from one customary vehicle driver to another customary vehicle driver to thereby ensure that one or more of a vehicle manufacturer (OEM) and/or a third-party entity (e.g., third-party warranty company, insurance company, and the like) may provide vehicle updates including, but not limited to, recall information, warranty information, manufacturer updates, hardware updates, software updates, etc. to a current customary vehicle driver who regularly drives the vehicle 102 and may be most impacted by the vehicle updates.

In some embodiments, the driver/value determination application 104 may allow a driver to create a driver profile that is associated with the particular driver. The driver profile may include driver identification information and contact information that may be utilized to associate a particular portion(s) of the lifespan of the vehicle 102 to the particular driver. The driver profile may also allow one or more drivers to subjectively select one or more vehicle system settings customizations that may be applied based on a designation made by the application 104 of the particular driver of the vehicle 102 as the customary vehicle driver. Upon application of the one or more vehicle systems, the driver/value determination application 104 may also enable the execution of one or more vehicle settings by one or more of the vehicle systems 112.

In one or more embodiments, the driver/value determination application 104 may also be utilized to electronically process one or more residual values of the vehicle 102 that may be applied during one or more portions of a current lifespan of the vehicle 102. The residual values may also be associated with and/or based on one or more customary vehicle drivers, a driving style of the one or more customary vehicle drivers, the number of miles the vehicle 102 has been driven by one or more customary vehicle drivers, and/or one or more locations at which the vehicle 102 is regularly driven and/or parked by one or more of the customary vehicle drivers.

In the illustrated embodiment of FIG. 1, the vehicle 102 may include an electronic control unit (ECU) 114 with provisions for processing, communicating, and interaction with various components of the vehicle 102 and other components of the environment 100. In one embodiment, the ECU 114 may be operably connected to the head unit 106, a storage unit 116, the communication unit 110, the vehicle systems 112, vehicle dynamic sensors 118, and vehicle GPS sensors 120. However, it is to be appreciated that the ECU 114 may be operably connected to numerous additional vehicle components and devices not included within the exemplary environment 100 illustrated in FIG. 1.

Generally, the ECU 114 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 114 and other components, networks, and data sources, of the environment 100.

In one embodiment, the driver/value determination application 104 may send one or more command signals to the ECU 114 to operably control one or more of the vehicle dynamic sensors 118 to output vehicle dynamic data associated with a driving style of the vehicle 102 which may pertain to particular dynamic categories including, but not limited to, speed, braking, steering, turn signal usage, and the like. Additionally, the driver/value determination application 104 may send one or more command signals to the ECU 114 to operably control one or more of the vehicle GPS sensors 120 to output vehicle location data associated with one or more geo-positional locations in which the vehicle 102 is driven.

As discussed below, the application 104 may analyze the vehicle dynamic data and/or the vehicle location data at one or more points in time to determine a vehicle driver pattern for one or more predetermined periods of time. Additionally, the application 104 may analyze the vehicle dynamic data and/or the vehicle location data at one or more points in time to determine a residual value of the vehicle 102 at one or more points in time that may also be associated to one or more particular customary vehicle drivers.

In one or more embodiments, the driver/value determination application 104 may also send one or more command signals to the ECU 114 to operably control one or more of the vehicle systems 112 in accordance with particular customary vehicle driver's driver profile (that includes customized vehicle settings) or a default vehicle settings profile (that includes default vehicle settings). In one configuration, the application 104 may designate a particular driver (e.g., driver A) of the vehicle 102 as a customary vehicle driver. The application 104 may thereby communicate with the ECU 114 to implement a set of customized vehicle settings that are associated with the particular driver based on the designation of the particular driver as a customary vehicle driver (e.g., driver A). The vehicle settings may be implemented upon the particular driver (e.g., driver A) approaching, entering, occupying, and/or driving the vehicle 102.

The driver/value determination application 104 may also be configured to determine a change in the customary vehicle driver (e.g., from the particular driver A to a different driver B) and may thereby communicate with the ECU 114 to implement a different (e.g., new) set of customized vehicle settings that are associated with the different driver (e.g., driver B) based on the determination in the change in designation of the customary vehicle driver to the different driver (e.g., from driver A to driver B). Accordingly, one or more of the vehicle systems 112 of the vehicle 102 may be controlled to provide vehicle settings that are applied for the newly designated customary vehicle driver (e.g., driver B).

The vehicle settings may be implemented upon the different driver (e.g., driver B) approaching, entering, occupying, and/or driving the vehicle 102.

In particular, in some circumstances, the application 104 may present a driver profile creation user interface (not shown) to the driver of the vehicle 102 which may be optionally utilized to create a driver profile associated with the driver. The driver profile creation user interface may also be utilized by the driver to input driver information associated with the driver such as the driver's name, address, telephone number(s), e-mail address(es), and other contact information.

The driver/value determination application 104 may also present a vehicle settings customization user interface which may allow the driver to optionally provide customization inputs of one or more vehicle settings that may be executed by one or more of the vehicle systems 112 to be added to the driver profile. In one embodiment, the application 104 may thereby send one or more command signals to the ECU 114 to operably control one or more of the vehicle systems 112 in accordance with the customizations of the one or more vehicle settings included within the driver profile.

In some cases, if the driver does not optionally choose to create a driver profile, the ECU 114 may receive one or more command signals from the driver/value determination application 104 to operably control one or more of the vehicle systems 112 in accordance with a default vehicle settings profile. The default vehicle settings profile may include one or more default vehicle settings that may be executed by one or more of the vehicle systems 112 when the application 104 determines that the customary vehicle driver is not specifically identified and/or has not provided customization inputs pertaining to one or more vehicle settings.

As discussed, the ECU 114 is also operably connected for computer communication (e.g., via the bus and/or the I/O interface) to the head unit 106. The head unit 106 may be connected to one or more display devices (not shown) (e.g., display screens), audio devices (not shown), and haptic devices (not shown) (e.g., haptic steering wheel) that are utilized to provide a human machine interface (not shown). As discussed below, the one or more display devices may be operated to display one or more user interfaces associated with the driver/value determination application 104 that may include the driver profile creation interface and the vehicle settings customization user interface.

In one embodiment, the head unit 106 may be operably connected to the storage unit 116. In alternate embodiments, the storage unit 116 may be included as a component of the head unit 106. The storage unit 116 may store one or more operating systems, associated operating system data, applications, associated application data, vehicle system and subsystem user interface/application data, and the like that are executed by the ECU 114 and/or the head unit 106 of the vehicle 102. In one configuration, the storage unit 116 may be used by the driver/value determination application 104 to store one or more driver profiles associated with one or more customary vehicle drivers.

In one or more embodiments, the storage unit 116 may also store a vehicle trip log 122. The vehicle trip log 122 may be utilized to store vehicle dynamic data and/or location data associated with each trip of the vehicle 102. In particular, the vehicle trip log 122 may include mileage data, speed data, acceleration data, RPM data, braking pressure data, braking rate data, steering angle data, turn signal usage data, and the like for each vehicle trip of the vehicle 102. It is appreciated that the vehicle trip log 122 may include additional types of vehicle dynamic data that may be sensed by the vehicle dynamic sensors 118, as discussed below. The vehicle trip log 122 may additionally include locational data associated with one or more locations in which the vehicle 102 is driven and/or parked for each trip of the vehicle 102. The vehicle dynamic data and the location data may be timestamped for a particular timeframe in which the data is captured to be further analyzed by the driver/value determination application 104 as discussed below.

In one embodiment, the storage unit 116 may additionally store a map database 124. The map database 124 may include one or more locational attributes associated with one or more particular geo-positional locations. The map database 124 may be continually updated through a connection to one or more third-party traffic providers, third-party statistical providers (e.g., crime statistics, weather data), third-party government institutions (e.g., police), and/or third-party corporations to provide the one or more locational attributes associated with one or more particular geo-positional locations.

The one or more locational attributes may include, but may not be limited to, crime statistics in a particular geo-positional location, environmental data in a particular geo-positional location, point-of-interest data of a particular geo-positional location, and the like. As discussed below, in some embodiments, the driver/value determination application 104 may evaluate the vehicle trip log 122 in addition to the map database 124 to determine if/when the customary vehicle driver changes and/or to determine the residual value of the vehicle 102 at one or more points in time during the current lifespan of the vehicle 102.

In an exemplary embodiment, the ECU 114 and/or the head unit 106 may also be operably connected to the communication unit 110. The communication unit 110 may communicate with one or more components of the operating environment 100 and/or additional systems and components outside of the operating environment 100. The communication unit 110 may include, but is not limited to, one or more transmitters (not shown), one or more antennas (not shown), and additional components (not shown) that may be utilized for wired and wireless computer connections and communications via various protocols, as discussed above. In some embodiments, the communication unit 110 may include or may be part of a telematics control unit (TCU) (not shown) of the vehicle 102. The communication unit 110 may be configured to communicate with the external server 108 through an internet cloud 126.

In an exemplary embodiment, the driver/value determination application 104 may utilize the communication unit 110 to communicate with the external server 108 to provide driver profile information, driver change information, and residual value information. Additionally, the driver/value determination application 104 may utilize the communication unit 110 to communicate with the external server 108 to receive vehicle updates that may include, but may not be limited to vehicular valuation information and/or vehicular alert information that may be utilized by the application 104 and/or communicated to the (current) customary vehicle driver as designated by the application 104. It is to be appreciated that the communication unit 110 may also be configured to communicate with one or more mobile devices (not shown) that may be used by one or more drivers and/or occupants of the vehicle 102.

As discussed, the ECU 114 may operably control one or more of the vehicle systems 112 based on communication(s) received from the driver/value determination application 104 to provide one or more vehicle settings to the designated customary vehicle driver. In one embodiment, the vehicle systems 112 may include any automatic or manual system that may be used to enhance the vehicle and/or driving. For example, the systems 112 may include, but may not be limited to: a vehicle HVAC system, a vehicle infotainment system, a vehicle engine control system, a vehicle GPS/navigation system, a vehicle seat position settings system, vehicle steering/mirror position setting system, a vehicle driver customization settings system, a vehicle transmission control system, vehicle stability control systems, an electronic stability control system, an anti-lock brake system, a brake assist system, an automatic brake prefill system, a low speed follow system, a cruise control system, an auto cruise control system, a lane departure warning system, a blind spot indicator system, a lane keep assist system, a brake pedal system, an electronic power steering system, a proximity sensor systems, and an electronic pretensioning system, among others.

As discussed above, one or more of the vehicle systems 112 may be operably controlled based on communication by the driver/value determination application 104 to the ECU 114. In particular, the one or more of the vehicle systems 112 may be operably controlled to provide one or more customized vehicle settings that may be specifically customized by and to be applied for a particular customary vehicle driver. Such customized vehicle settings may be provided upon the customary vehicle driver approaching, entering, occupying, and/or driving the vehicle 102. Alternatively, the one or more vehicle systems 112 may be operably controlled to provide one or more default vehicle settings that may be provided for an unidentified customary vehicle driver and/or a customary vehicle driver that chooses not to customize any vehicle settings. Such default vehicle settings may be similarly provided upon the customary vehicle driver approaching, entering, occupying, and/or driving the vehicle 102.

In an exemplary embodiment, the vehicle dynamic sensors 118 may include, vehicle mileage sensors, vehicle speed sensors, vehicle acceleration sensors, vehicle angular velocity sensors, accelerator pedal sensors, brake sensors, steering wheel angle sensors, vehicle directional sensors (e.g., vehicle compass), throttle position sensors, respective wheel sensors, anti-lock brake sensors, camshaft sensors, among other sensors. Additionally, the vehicle dynamic sensors may be configured as specific types of sensors that provide data pertaining to road conditions and the surrounding environment of the vehicle 102, such as, but not limited to, antilock brake sensors, daylight sensors, temperature sensors, wheel slip sensors, traction control sensors, etc. It is understood that the vehicle dynamic sensors 118 may be any type of sensor, for example, acoustic, electric, environmental, optical, imaging, light, pressure, force, thermal, temperature, proximity, among others.

As discussed below, the driver/value determination application 104 may utilize the vehicle dynamic sensors 118 to output vehicle dynamic data to be populated within the vehicle trip log 122 at one or more points in time. Such data may be further evaluated to determine one or more driver patterns associated with the driving of the vehicle 102 by one or more respective customary vehicle drivers. Additionally, such data may be evaluated to determine the residual value of the vehicle 102 at one or more points in time.

In one or more embodiments, the vehicle GPS sensors 120 may be utilized to provide the positional parameters that may include data that pertains to the position (e.g., geopositional coordinates, GNSS coordinates) of the vehicle 102. As discussed below, the driver/value determination application 104 may utilize the vehicle GPS sensors 120 to output location data to be populated within the vehicle trip log 122 at one or more points in time. Such data may be further evaluated to determine one or more driver patterns associated with the driving of the vehicle 102 by one or more respective customary vehicle drivers. Additionally, such data may be evaluated to determine the residual value of the vehicle 102 at one or more points in time.

With respect to the external server 108, in one or more embodiments, the external server 108 may be owned and/or operated by a vehicle OEM and/or a third-party entity and may include a processor(s) (not shown), a memory (not shown), and a communication device (not shown). The external server 108 may be configured to communicate with one or more components of the vehicle 102 through wireless communication that may occur through the internet cloud 126. In one embodiment, the vehicle OEM and/or third party entity may utilize the external server 108 as an external information repository that allows the vehicle OEM and/or third party entity to store and/or communicate data that pertains to the ownership, usage, value, and/or maintenance of the vehicle 102.

In one embodiment, the external server 108 may include a driver repository 128. The driver repository 128 may be configured to store information pertaining to one or more identified and/or unidentified customary drivers of a plurality of vehicles including the vehicle 102. The driver repository 128 may also include time span values (e.g., data values) that pertain to one or more time spans that are associated with one or more customary vehicle drivers. Additionally, in some cases, when the driver of the vehicle 102 does create an associated driver profile, the external server 108 may be configured to retrieve identification/contact information pertaining the customary vehicle driver and may thereby populate the driver repository with such information. In some embodiments, the application 104 may utilize the driver repository 128 to determine the identification/contact information in order to send vehicle updates to the customary vehicle driver.

In one or more embodiments, the external server 108 may also include a residual value repository 130 that is configured to store a full residual value of the vehicle 102 (e.g., full residual value of a new vehicle) and may be further updated by one or more external factors such as, but not limited to, the market value of the model and model year of the vehicle 102, the (market) availability of the model and model year of the vehicle 102, accident history of the vehicle 102, mileage depreciation associated with the make and model year of the vehicle 102, environmental factors (e.g., weather/climate factors, political factors) that may affect the residual value of the vehicle 102, and additional economic trends that may affect the residual value of the vehicle 102.

The residual value repository may also be configured to be updated to store non-static vehicle dynamic threshold values that pertain to various types of vehicle dynamic categories (e.g., mileage driven, speed, braking, steering angle) that may categorize a driving style of the vehicle 102 based on a numeric value (e.g., 1-10) and thereby may be utilized to designate the driving style of the vehicle 102 as being lightly/softly driven to heavily/severely driven. As discussed below, the driver/value determination application 104 may access the residual value repository 130 to acquire the full residual value of the vehicle 102 and/or data pertaining to one or more external factors that may affect the residual value of the vehicle 102 to thereby electronically process the residual depreciation of the vehicle 102 that is associated with each of the customary vehicle drivers.

In one or more embodiments, the external server 108 may additionally host a vehicular alert engine 132. The vehicular alert engine 132 may be populated by the vehicle OEM and/or third-party entities with vehicle updates including, but not limited to, recall information, warranty information, manufacturer updates, hardware updates, software updates, and the like. In one embodiment, the vehicular alert engine 132 may also be configured to send one or more vehicle updates to alert the customary vehicle driver.

In some configurations, when information associated with the driver such as the driver's name, address, telephone number(s), e-mail address(es), and other contact information is provided within the driver profile, such information may be utilized to send the vehicle updates. In some embodiments, certain updates may be sent to the driver of the vehicle 102 upon the application 104 determining that the customary vehicle driver has changed. In additional embodiments, certain updates associated with the residual value of the vehicle 102 may also be sent to the customary vehicle driver per the driver's request, an event that may affect the customary vehicle driver and/or the vehicle 102 (e.g., traffic incident) and/or upon the application 104 determining that the customary vehicle driver has changed.

II. The Vehicle Driver Change/Residual Value Determination Application and Related Methods The components of the driver/value determination application 104 and methods that are electronically executed by the driver/value determination application 104 will now be described according to an exemplary embodiment and with reference to FIG. 1. In an exemplary embodiment, the driver/value determination application 104 may be stored on the storage unit 116 of the vehicle 102 and may be executed by the head unit 106 of the vehicle 102. In an alternate embodiment, the application 104 may be executed by the ECU 114 of the vehicle 102. In an additional embodiment, the driver/value determination application 104 may be stored on the external server infrastructure 108 and accessed by the communication unit 110 and executed by the ECU 114 and/or the head unit 106 of the vehicle 102.

During an initial execution of the driver/value determination application 104 upon the initial usage of the vehicle 102 for a predetermined period of time (e.g., 5 hours) and/or a predetermined distance (e.g., 50 miles), the application 104 may operate to determine information relating to an initial customary vehicle driver that substantially/regularly drives the vehicle 102. Additionally, as discussed below, if the application 104 determines that the customary vehicle driver has changed, the application 104 may operate to determine information relating to the new customary vehicle driver that substantially/regularly drives the vehicle 102. Such information may be further utilized to control one or more of the vehicle systems 112 to execute one or more customized vehicle settings associated with the customary vehicle driver. Additionally, such information may also be utilized to provide the customary vehicle driver with one or more vehicle updates as provided by the vehicular alert engine 132 of the external server 108.

Figure 2:
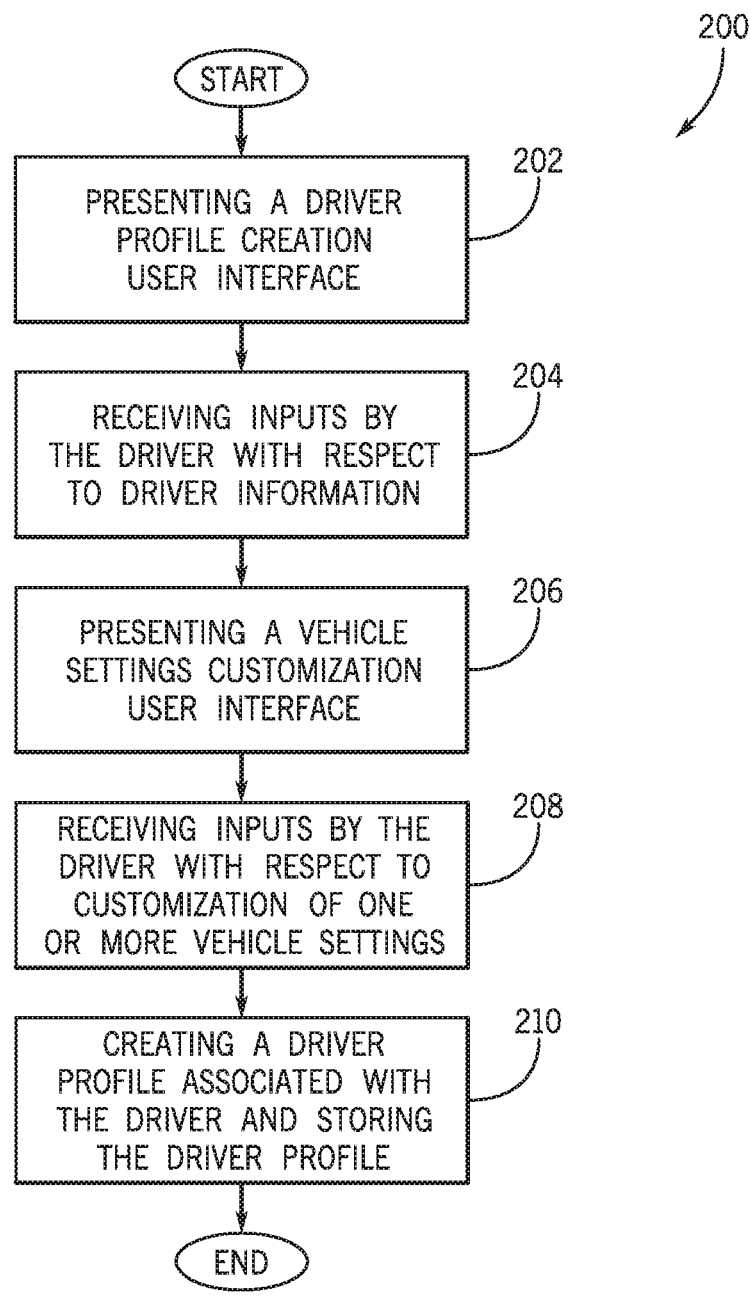
FIG. 2 is a process flow diagram of a method for creating a driver profile associated with a particular driver according to an exemplary embodiment of the present disclosure.

FIG. 2 is a process flow diagram of a method 200 for creating a driver profile associated with a particular driver according to an exemplary embodiment of the present disclosure. FIG. 2 will be described with reference to the components of FIG. 1, though it is to be appreciated that the method 200 of FIG. 2 may be used with other systems/components. In an exemplary embodiment, the driver/value determination application 104 may include a driver profile creation module 134 which may execute the method 200 upon the usage of the vehicle 102 for a predetermined period of time and/or a predetermined of distance. Additionally, the driver profile creation module 134 may also execute the method 200 upon the designation of new customized vehicle driver by the application 104. In particular, the method 200 may be utilized to optionally (at the option of the driver) to create a driver profile for the driver of the vehicle 102.

The method 200 may begin at block 202, wherein the method 200 may include presenting a driver profile creation user interface. In an exemplary embodiment, the driver profile creation module 134 may send one or more command signals to the ECU 114 and/or the head unit 106 to operably control the display unit to present the driver profile creation user interface to the driver of the vehicle 102. In one configuration, the driver profile creation user interface may include a driver profile creation user interface input icon (not shown) that may be optionally inputted to create a driver profile associated with the driver of the vehicle 102. Upon determining that the driver profile creation user interface input icon is inputted, the driver profile creation module 134 may employ the display unit to present a plurality of user interface input text boxes associated with particular identification/contact categories including, but not limited to, driver name, driver address, driver telephone numbers, driver email addresses, and/or additional contact information.

In an alternate embodiment, the driver profile creation module 134 may communicate with the communication unit 110 of the vehicle 102 to determine if one or more mobile devices are wirelessly connected to the vehicle 102 (e.g., through a Bluetooth® wireless connection). Upon determining that one or more mobile devices are wirelessly connected to the vehicle 102, the driver profile creation module 134 may utilize the communication unit 110 to communicate data associated with the presentation of the driver profile creation user interface and associated input icons and/or text boxes to be presented via a display device (not shown) of the mobile device(s). This functionality may allow the driver of the vehicle 102 to view and provide inputs to the driver profile creation user interface through the mobile device(s), possibly outside of the vehicle 102.

The method 200 may proceed to block 204, wherein the method 200 may include receiving inputs by the driver with respect to driver information. In an exemplary embodiment, if the driver of the vehicle 102 inputs one or more of the plurality of user interface input text boxes associated with the particular information categories, the ECU 114 and/or the head unit 106 may communicate respective data to the driver profile creation module 134. In other words, particular information associated with the driver including, but not limited to, the driver's name, the driver's address, the driver's telephone numbers, the driver's email addresses, and/or additional contact information as provided by the driver may be communicated to the driver profile creation module 134.

The method 200 may proceed to block 206, wherein the method 200 may include presenting a vehicle setting customization user interface. In an exemplary embodiment, upon receiving the inputs by the driver with respect to the driver information, the driver profile creation module 134 may send one or more command signals to the ECU 114 and/or the head unit 106 to operably control the display unit to present the vehicle settings customization user interface to the driver of the vehicle 102. In one configuration, the vehicle settings customization user interface may include a plurality of user interface checkboxes that may be presented next to and associated with particular vehicle systems 112.

In one embodiment, the driver profile creation module 134 may determine if the driver inputs any of the particular user interface checkboxes. Upon determining that the driver inputs of any of the user interface checkboxes associated with particular vehicle systems 112, the driver profile creation module 134 may present one or more user interface drop-down boxes and/or text input boxes that allow the driver to select and customize one or more vehicle settings that are associated with each of the (checked) particular vehicle systems 112. For example, if the driver selects a checkbox associated with a vehicle lighting system, drop-down boxes associated with various lighting system settings (particular lighting options to be enabled when the driver approaches and/or enters the vehicle 102) may be presented to be input by the driver.

In an alternate embodiment, the driver profile creation module 134 may communicate with the communication unit 110 of the vehicle 102 to determine if one or more mobile devices are wirelessly connected to the vehicle 102 (e.g., through a Bluetooth® wireless connection). Upon determining that one or more mobile devices are wirelessly connected to the vehicle 102, the driver profile creation module 134 my utilize the communication unit 110 to communicate data associated with the presentation of the vehicle settings customization user interface and associated input checkboxes, drop-down boxes, and/or text input boxes to be presented via a display device (not shown) of the mobile device(s). This functionality may allow the driver of the vehicle 102 to view and provide inputs to the vehicle settings customization user interface through the mobile device(s), possibly outside of the vehicle 102.

The method 200 may proceed to block 208, wherein the method 200 may include receiving inputs by the driver with respect to customization of one or more vehicle settings. In an exemplary embodiment, if the driver of the vehicle 102 inputs one or more of the plurality of user interface drop-down boxes and/or text input boxes associated with the customization of vehicle settings associated with particular vehicle systems, the ECU 114 and/or the head unit 106 may communicate respective data to the driver profile creation module 134. In other words, particular information associated with the customized vehicle settings associated with one or more of the vehicle systems 112 may be communicated to the driver profile creation module 134.

The method 200 may proceed to block 210, wherein the method 200 may include creating a driver profile associated with the driver and storing the driver profile. In an exemplary embodiment, the driver profile creation module 134 may send one or more command signal(s) to the ECU 114 and/or the head unit 106 to access the storage unit 116 of the vehicle 102. Upon accessing the storage unit 116 of the vehicle 102, the driver profile creation module 134 may create the driver profile as a data file to be stored on the storage unit 116. The driver profile creation module 134 may thereafter populate the driver profile associated with the driver of the vehicle 102 with the driver information (as received as block 204) and the customization of one or more vehicle settings (as received at block 208). As discussed below, the driver profile may be accessed if the particular driver is determined as the customary vehicle driver in order to execute the one or more vehicle settings and/or to communicate vehicle updates to the driver of the vehicle 102.

In one embodiment, upon the creation of the driver profile associated with the driver of the vehicle 102, the driver profile creation module 134 may communicate with the communication unit 110 of the vehicle 102 to communicate information pertaining to the driver of the vehicle 102 to the external server 108. In particular, the communication unit 110 may communicate with the external server 108 through the internet cloud 126 to populate the driver repository 128 with information pertaining to the driver. Accordingly, a vehicle OEM and/or a third party entity may be provided with information to communicate one or more vehicle updates to the customary vehicle driver based on vehicle updates and/or alerts being generated by the vehicular alert engine 132.

Figure 3:
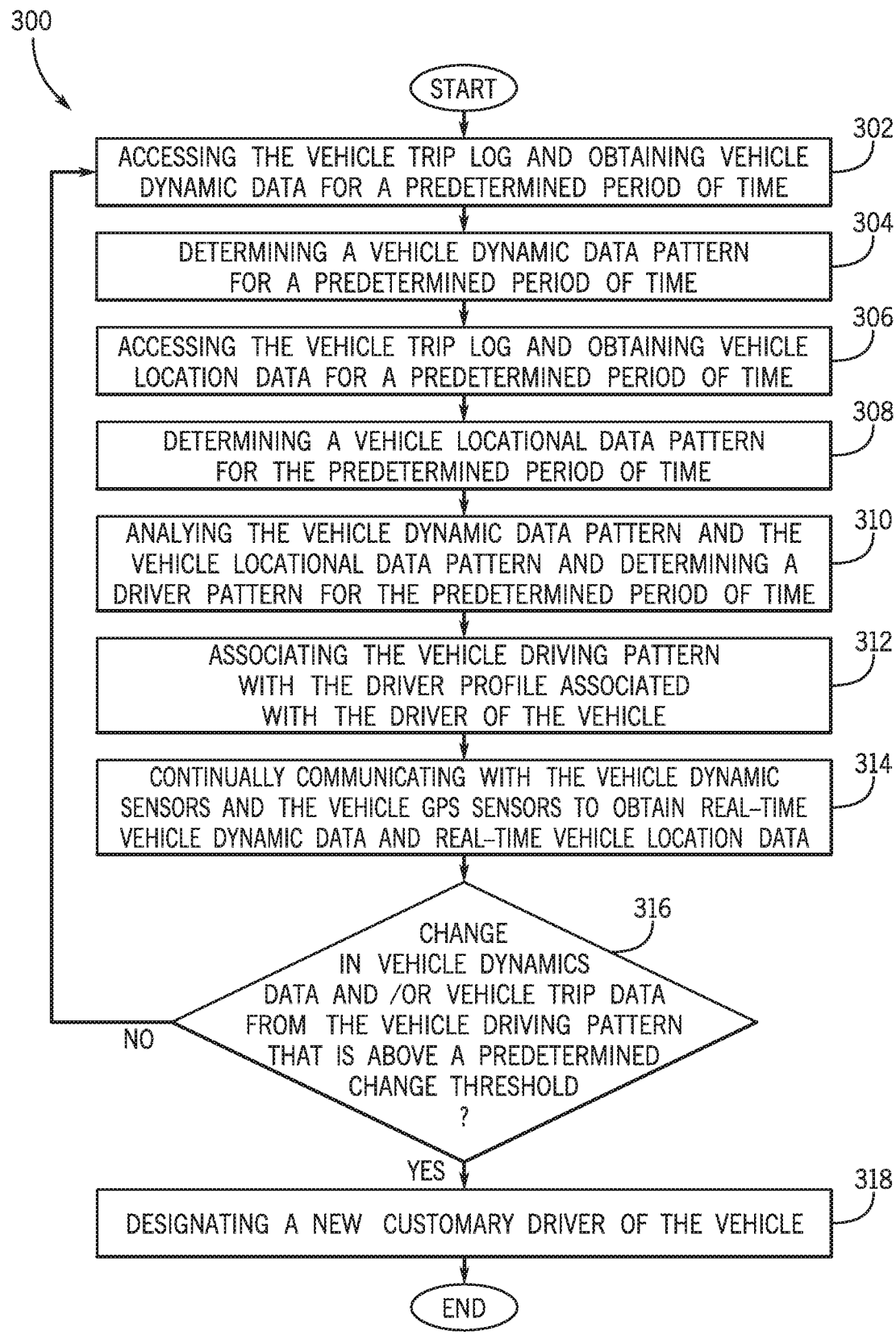
FIG. 3 is a process flow diagram of a method for determining driving patterns associated with a driver of the vehicle and determining a change in the driving pattern according to an exemplary embodiment of the present disclosure.

FIG. 3 is a process flow diagram of a method 300 for determining driving patterns associated with a driver of the vehicle 102 and determining a change in the driving pattern according to an exemplary embodiment of the present disclosure. FIG. 3 will be described with reference to the components of FIG. 1, though it is to be appreciated that the method 300 of FIG. 3 may be used with other systems/components.

In an exemplary embodiment, upon creation of the driver profile (as discussed above with respect to block 210 of the method 200), the driver profile creation module 134 may communicate data pertaining to a newly added driver to a driver pattern determinant module 136 of the driver/value determination application 104. In one embodiment, the driver pattern determinant module 136 may be configured to determine a vehicle driving pattern for one or more periods of time during the lifespan of the vehicle 102. As discussed below, the vehicle driving pattern(s) may be utilized to designate the current driver of the vehicle 102 as a customary vehicle driver and may be further utilized to determine if there is a change in the customary vehicle driver from one driver to another. In one or more embodiments, the driver pattern determinant module 136 may communicate with the ECU 114 of the vehicle 102 to operably control the vehicle dynamic sensors 118 and the vehicle GPS sensors 120 to output vehicle dynamic data and vehicle location data to be populated within the vehicle trip log 122 stored on the storage unit 116 of the vehicle 102.

The method 300 may begin at block 302, wherein the method 300 may include accessing the vehicle trip log 122 and obtaining vehicle dynamic data for a predetermined period of time. As discussed above, the vehicle trip log 122 may be utilized to store vehicle dynamic data associated with each trip of the vehicle 102. In particular, the vehicle trip log 122 may include speed data, acceleration data, RPM data, braking pressure data, braking rate data, steering angle data, turn signal usage data, and the like for each vehicle trip of the vehicle 102 that is determined based on dynamic data that is populated by the vehicle dynamic sensors 118. The vehicle dynamic data may also be timestamped for particular timeframe in which the data is captured to be further analyzed by the driver pattern determinant module 136.

In an exemplary embodiment, the driver pattern determinant module 136 may access the storage unit 116 of the vehicle 102 to further access the vehicle trip log 122. The driver pattern determinant module 136 may thereby access the vehicle dynamic data captured and populated by the vehicle dynamic sensors 118 for a plurality of trips of the vehicle 102 that were conducted during the predetermined period of time (e.g., 60 days). In other words, the driver pattern determinant module 136 may collect data including, but not limited to, mileage data, speed data, acceleration data, RPM data, braking pressure data, braking rate data, steering angle data, turn signal usage data, and the like for each trip of the vehicle 102 conducted during the predetermined period of time.

The method 300 may proceed to block 304, wherein the method 300 may include determining a vehicle dynamic data pattern for a predetermined period of time. In one or more embodiments, upon collecting of data from the vehicle trip log associated with the predetermined period of time, the driver pattern determinant module 136 may analyze the vehicle dynamic data obtained for the predetermined period of time. In particular, the driver pattern determinant module 136 may analyze various types of vehicle dynamic data (discussed above) for each trip of the vehicle 102 conducted during the predetermined period of time to determine driving trends expressed by the particular driver of the vehicle 102.

In one configuration, the driver pattern determinant module 136 may determine driving trends in one or more vehicle dynamic categories during different phases of driving of the vehicle 102. The different phases of driving of the vehicle 102 may be based on the environment in which the vehicle 102 is being driven. For example, different phases of driving of the vehicle 102 may include driving within a low speed environment (e.g., on a low speed road, under an average speed threshold of 35 MPH), driving within a medium speed environment (between an average speed threshold of 36 MPH-60 MPH), driving within a high speed environment (e.g., on a high speed highway, above an average speed threshold of 61 MPH), during sharp turns, during curves, and the like.

In one embodiment, the driver pattern determinant module 136 may determine the driving trends in one or more vehicle dynamic categories that may include, but may not be limited to, the miles driven during the different phases of driving of the vehicle 102, the average speed of the vehicle 102 during the different phases of driving of the vehicle 102, the average acceleration rate of the vehicle 102 during the different phases of driving of the vehicle 102, the average RPM during different phases of driving of the vehicle 102, the average braking rate of the vehicle 102 during the different phases of driving of the vehicle 102, the average braking pressure of the vehicle 102 during the different phases of driving of the vehicle 102, the average steering angle during the different phases of driving of the vehicle 102, the average turn signal usage during the different phases of driving of the vehicle 102, and the like. It is to be appreciated that the driver pattern determinant module 136 may determine driving trends in additional contemplated vehicle dynamic categories based on additional vehicle dynamic data that is captured by the vehicle dynamic sensors 118.

In one configuration, upon determining the driving trends in one or more vehicle dynamic categories based on the vehicle dynamic data retrieved from the vehicle trip log 122, the driver pattern determinant module 136 may aggregate the determined driving trends for each of the vehicle dynamic categories to thereby determine and output a vehicle dynamic driving pattern that is associated with the driver of the vehicle 102. The vehicle dynamic driving pattern may include various driving trend data points that pertain to each of the vehicle dynamic categories that may be further evaluated by the driver pattern determinant module 136 of the driver/value determination application 104.

In particular, the vehicle dynamic driving pattern may include driving trend data points associated with the driving style of the vehicle 102 that is specific and subjective to the current driver. In one embodiment, upon determining and outputting the vehicle dynamic data pattern, the driver pattern determinant module 136 may access the storage unit 116 of the vehicle 102 and may store the vehicle dynamic data pattern associated with the current driver of the vehicle 102 for the particular predetermined period of time to be further evaluated (as discussed below).

The method 300 may proceed to block 306, wherein the method 300 may include accessing the vehicle trip log 122 and obtaining vehicle location data for the predetermined period of time. As discussed above, the vehicle trip log 122 may be utilized to store location data associated with each trip of the vehicle 102. In particular, the vehicle trip log 122 may include locational data associated with one or more locations in which the vehicle 102 is driven and/or parked for each trip of the vehicle 102. The location data may be timestamped for a particular timeframe in which the data is captured to be further analyzed by the driver/value determination application 104.

In an exemplary embodiment, the driver pattern determinant module 136 may access the storage unit 116 of the vehicle 102 to further access the vehicle trip log 122. The driver pattern determinant module 136 may thereby access and analyze the vehicle location data captured and populated by the vehicle GPS sensors 120 for a plurality of trips of the vehicle 102 that were conducted during the predetermined period of time (e.g., 60 days). In other words, the driver pattern determinant module 136 may collect geo-positional parameters that may include data that pertains to the geo-positional locations (e.g., GNSS coordinates) of the vehicle 102 during each trip of the vehicle 102 conducted during the predetermined period of time.

The method 300 may proceed to block 308, wherein the method 300 may include determining a vehicle locational data pattern for a predetermined period of time. In one or more embodiments, upon collecting vehicle location data from the vehicle trip log 122 associated with the predetermined period of time, the driver pattern determinant module 136 may analyze the geo-positional locations of the vehicle 102 for the predetermined period of time. In particular, the driver pattern determinant module 136 may access the storage unit 116 of the vehicle 102 to retrieve data from the map database 124 based on the geo-position locations and timestamps of the particular timeframe in which the data was captured to be further analyzed.

As discussed above, the map database 124 may include one or more locational attributes associated with one or more particular geo-positional locations. The one or more locational attributes may include, but may not be limited to, crime statistics in a particular geo-location, environmental data in a particular geo-location, point-of-interest data of a particular location, and the like. In one embodiment, the driver pattern determinant module 136 may determine locational timing trends expressed by the particular driver of the vehicle 102 based on one or more locations that the current driver may regularly/semi-regularly travel to during one or more particular timeframes of one or more days.

In one configuration, the driver pattern determinant module 136 may categorize driving trends during different timeframes based on point-of-interest data retrieved by the map database. In particular, the module 136 may identify driving trends to one or more particular points of interest that are regularly/semi-regularly driven to by the driver of the vehicle 102 and may thereby determine locational timing trends that are utilized by the current driver. Such locational timing trends may correspond to regularly/semi-regularly traveled locations conducted for purposes (e.g., driving on weekdays to a particular office location) that may be subjective to the current driver of the vehicle 102. For example, locational timing trends may be determined based on the current driver's frequent travel to certain locations such as a home, an office, a shopping center, a gym, and the like that may be subjective to the current driver.

Additionally, locational timing trends may also correspond to the timing of regular trips conducted by the current driver to regularly traveled locations and/or when the vehicle 102 is not regularly driven by the current driver of the vehicle 102. Such locational timing trends may correspond to timeframes when the vehicle 102 is more heavily utilized to determine driving trends as to when the current driver usually drives the vehicle 102. For example, locational timing trends may be determined based on the current driver's frequent use of the vehicle 102 during weekday mornings, weekday evenings, and Saturday mornings. Additionally, locational trends may be determined based on the current driver's infrequent use of the vehicle 102 during weekday afternoons, and Sundays.

In one embodiment, upon determining the locational timing trends based on the vehicle locational data retrieved from the vehicle trip log 122 and associated data retrieved from the map database 124, the driver pattern determinant module 136 may aggregate the determined locational timing trends with respect to the trends with respect to one or more particular points of interest that are regularly/semi-regularly driven to by the driver of the vehicle 102 and the timing of regular trips conducted by the current driver to regularly traveled locations and/or when the vehicle 102 is not regularly driven by the current driver of the vehicle 102 to thereby determine and output a vehicle locational data pattern associated with the current driver.

The vehicle locational data pattern may include various trend data points that pertain to the determined locational timing trends with respect to one or more particular points of interest that are regularly/semi-regularly driven by the driver of the vehicle 102 and the timing of regular/semi-regular trips conducted by the current driver to regularly traveled locations and/or when the vehicle 102 is not regularly driven by the current driver of the vehicle 102. For example, the vehicle locational data pattern may include trend data points associated with the regularly visited locations driven by the driver and the frequent and infrequent driving times pertaining to driving of the vehicle 102 by the current driver. In one embodiment, upon determining the vehicle locational data pattern, the driver pattern determinant module 136 may access the storage unit 116 of the vehicle 102 and may store the vehicle locational data pattern associated with the current driver of the vehicle 102 for a particular predetermined period of time to be further evaluated (as discussed below).

The method 300 may proceed to block 310, wherein the method 300 may include analyzing the vehicle dynamic data pattern and the vehicle locational data pattern and determining a driver pattern for the predetermined period of time. In an exemplary embodiment, the driver pattern determinant module 136 may access the storage unit 116 of the vehicle 102 to further retrieve the vehicle dynamic data pattern and the vehicle locational data pattern that is associated with the current driver of the vehicle 102. In one configuration, the driver pattern determinant module 136 may thereby aggregate data points captured at one or more particular timeframes to determine and output a vehicle driver pattern that is associated with the current driver of the vehicle 102 (for one or more periods of time) that is thereby designated as a customary vehicle driver.

The method 300 may proceed to block 312, wherein the method 300 may include associating the vehicle driving pattern with the driver profile associated with the driver of the vehicle 102. In one embodiment, the driver pattern determinant module 136 may communicate with a driver pattern change determinant module 138 of the vehicle driver/value application 104 upon determining the vehicle driver pattern. The driver pattern change determinant module 138 may thereby access the storage unit 116 of the vehicle 102 to determine if a driver profile associated with the current driver of the vehicle 102 has been previously stored (based on the execution of the method 200, based on the driver's option to setup the driver profile). In particular, the driver pattern change determinant module 138 may query the storage unit 116 to determine if the driver profile was previously created and stored on the storage unit 116.

If it is determined that the driver profile associated with the current driver of the vehicle 102 was previously created and stored on the storage unit 116, the driver pattern change determinant module 138 may electronically link and associate the vehicle driver profile associated with the current driver of the vehicle 102 to the current driver's vehicle driver profile. Accordingly, the driver pattern change determinant module 138 may designate the current driver of the vehicle 102 as the customary vehicle driver. The driver profile associated with the current driver may be thereafter be utilized to execute customized vehicle settings as selected by the current customary vehicle driver and/or provide vehicle updates to the current customary vehicle driver based on the identification/contact information included within the driver profile.

As discussed below, the driver pattern change determinant module 138 may continually collect vehicle dynamic data and vehicle location data to be electronically analyzed in comparison to the vehicle driving pattern stored on the storage unit 116 to thereby determine if the customary vehicle driver has changed (e.g., based on a new owner of the vehicle 102 or a different primary driver of the vehicle 102).

The method 300 may proceed to block 314, wherein the method 300 may include continually communicating with the vehicle dynamic sensors 118 and the vehicle GPS sensors 120 to obtain real-time vehicle dynamic data and real-time vehicle location data. In one or more embodiments, the driver pattern change determinant module 138 may communicate with the vehicle dynamic sensors 118 and the vehicle GPS sensors 120 to continually receive real-time vehicle dynamic data and real-time vehicle location data to be continually evaluated and compared against the vehicle driving pattern associated with the currently designated customary vehicle driver.

The method 300 may proceed to block 316, wherein the method 300 may include determining if there is a change in vehicle dynamic data and/or the vehicle location data from the vehicle driving pattern that is above a predetermined change threshold(s). In one embodiment, the driver pattern change determinant module 138 may determine if there is a change in the customary vehicle driver based on a comparison of the real-time sensor data with the vehicle driving pattern. In particular, the driver pattern change determinant module 138 may implement one or more predetermined change thresholds that are associated with deviations from the vehicle dynamic data patterns and vehicle locational data patterns.

The one or more predetermined change thresholds may include values (e.g., distance values, time based values, vehicle dynamic based values) that may be utilized as markers that allow the driver pattern change determinant module 138 to determine if there is a change in the driving pattern of the vehicle 102 over a predetermined course of time that may indicate that a different driver is driving the vehicle 102. In other words, the predetermined change thresholds may be utilized to determine if the driving pattern of the vehicle 102 that is associated with the currently designated customary vehicle driver has been disrupted or (significantly) changed based on the comparison against the real-time vehicle dynamic data and/or the real-time vehicle location data to thereby determine that another driver is regularly driving the vehicle 102 over a predetermined period of time (as a customary vehicle driver).

For example, the driver pattern change determinant module 138 may compare vehicle dynamic data and vehicle location data (captured at block 314) to the vehicle driving pattern to determine if there are changes in the average speed of the vehicle 102 during the different phases of driving of the vehicle 102, the average acceleration rate of the vehicle 102 during the different phases of driving of the vehicle 102, the average RPM during different phases of driving of the vehicle 102 during the different phases of driving of the vehicle 102, the regularly traveled locations and/or the timing of regular trips conducted by the current driver to regularly traveled locations that are above predetermined threshold values for each of the aforementioned data points.

If it is determined that there is not a change in the vehicle dynamic data and/or the vehicle trip data that is above the predetermined change threshold(s), the method 300 may be continually be executed to add additional data for one or more additional predetermined periods of time if and until a change in the vehicle dynamic data and/or the vehicle trip data from the vehicle driving pattern is determined to be above the predetermined change threshold(s). It is to be appreciated that the process steps of blocks 302-316 may be completed a numerous amount of times for a plurality of predetermined periods of time to thereby add additional data to the vehicle driving pattern for the currently designated customary vehicle driver. Accordingly, the vehicle driving pattern associated with the current driver may be continually updated until the driver pattern change determinant module 138 determines a change in the customary vehicle driver from the current driver to another driver (a newly designated customary vehicle driver).

If the driver pattern change determinant module 138 determines that there is a change in the vehicle dynamic data and/or the vehicle trip data of the vehicle 102 that is above a predetermined change threshold(s) from the vehicle driving pattern associated with the currently designated customary vehicle driver (at block 316), the method 300 may proceed to block 318, wherein the method 300 may include designating a new customary vehicle driver. In one embodiment, the driver pattern change determinant module 138 may designate a new (e.g., different, additional) driver of the vehicle 102 as the customary vehicle driver. In other words, the customary vehicle driver will be recognized as a different driver than the driver previously designated as the customary vehicle driver.

In one embodiment, upon designating the new customary vehicle driver, the driver pattern change determinant module 138 may communicate respective data to the driver profile creation module 134. The driver profile creation module 134 may thereby execute the method 200 to allow the newly designated vehicle driver to provide inputs with respect to driver information and with respect to the customization of one or more vehicle settings associated with one or more of the vehicle systems 112. Additionally, the driver profile creation module 134 may thereby create the driver profile associated with the newly designated customary vehicle driver and may store the newly created driver profile on the storage unit 116 to be further utilized to execute the one or more customized vehicle settings and/or to provide one or more vehicle updates to the newly designated customary vehicle driver.

In one embodiment, upon creation of the driver profile, the driver profile creation module 134 may communicate data pertaining to a newly designated customary vehicle driver to the driver pattern determinant module 136 of the driver/value determination application 104. In one embodiment, the driver pattern determinant module 136 may be configured to determine a vehicle driving pattern for one or more periods of time and may associate the vehicle driving pattern to the newly designated customary vehicle driver through the execution of the method 300 of FIG. 3.

Accordingly, the driver pattern determinant module 136 and the driver pattern change determinant module 138 may thereby execute the process steps of blocks 302-316. The driver pattern determinant module 136 may thereby determine a vehicle dynamic data pattern and a vehicle locational data pattern for a predetermined period of time that is associated with the newly designated customary vehicle driver. The driver pattern determinant module 136 may further determine a vehicle driving pattern for the predetermined period(s) of time and may associate the vehicle driving pattern with the driver profile associated with the newly designated customary vehicle driver.

Furthermore, the driver pattern change determinant module 138 may determine if there is change in captured vehicle dynamic data and/or vehicle trip data from the vehicle driving pattern that is above the predetermined threshold to determine if an additional new driver is to be designated as the customary vehicle driver. Accordingly, the application 104 may continually ensure that the customary vehicle driver is designated to execute one or more customized vehicle settings and/or to provide vehicle updates to a current customary vehicle driver.

In one embodiment, upon designating each customary vehicle driver, the driver pattern change determinant module 138 may communicate data associated with the driver profile of the currently designated customary vehicle driver to a residual value determinant module 140 of the driver/value determination application 104. Upon receiving data pertaining to the designated customary vehicle driver, the residual value determinant module 140 may also be utilized to electronically process one or more residual values of the vehicle 102 that may be applied during one or more portions of the lifespan of the vehicle 102. The residual values may also be associated with one or more designated customary vehicle drivers, a driving style on one or more particular customary vehicle drivers, locations at which the vehicle 102 is driven, and may be utilized to determine a residual depreciation amount associated with one or more portions of the current lifespan of the vehicle 102.

Figure 4:
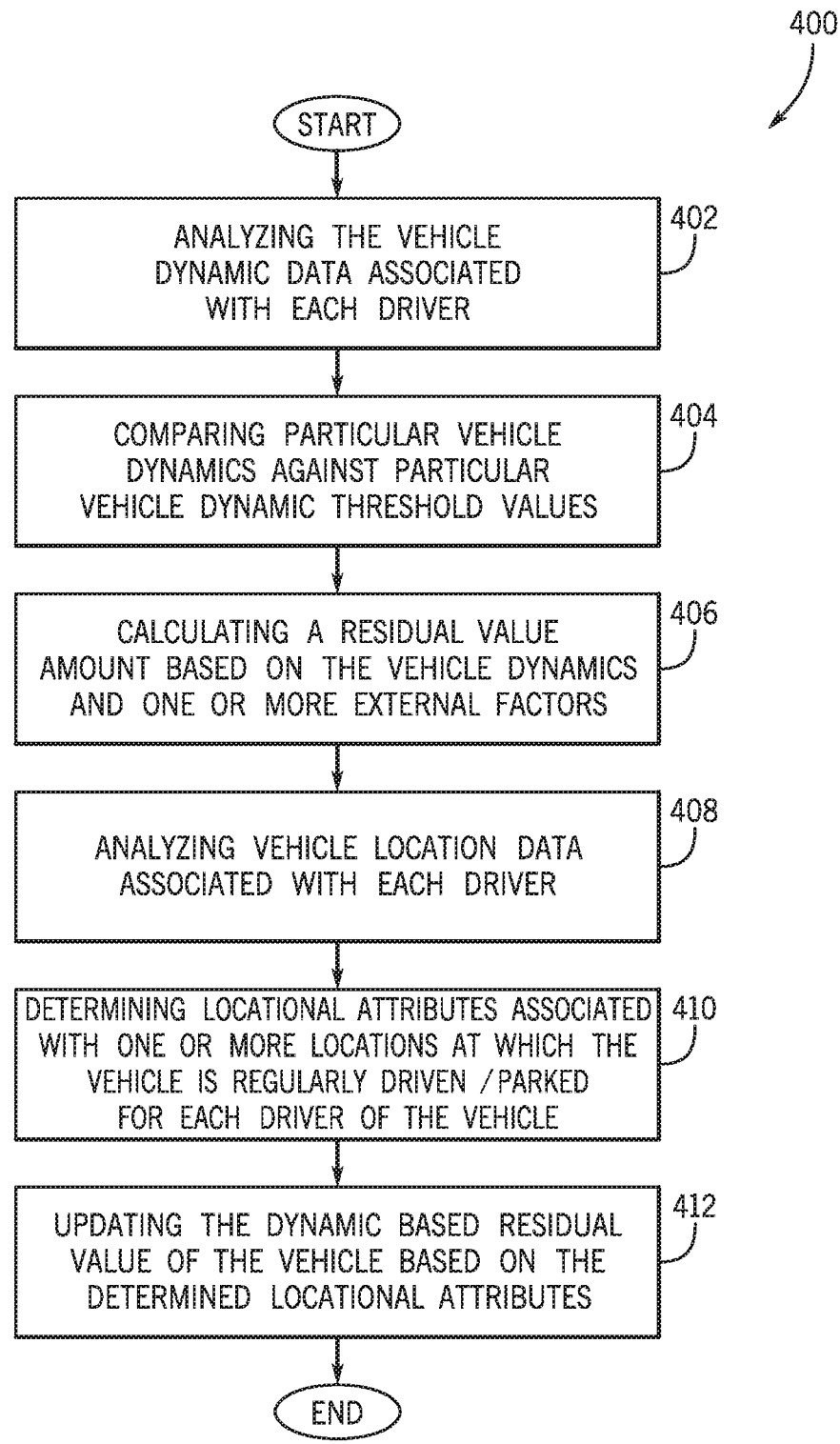
FIG. 4 is a process flow diagram of a method for determining a residual value of the vehicle according to an exemplary embodiment of the present disclosure.

FIG. 4 is a process flow diagram of a method 400 for determining a residual value of the vehicle 102 according to an exemplary embodiment of the present disclosure. FIG. 4 will be described with reference to the components of FIG. 1, though it is to be appreciated that the method 400 of FIG. 4 may be used with other systems/components. The method 400 may begin at block 402, wherein the method 400 may include analyzing the vehicle dynamic data associated with each designated customary vehicle driver. In one embodiment, the residual value determinant module 140 may analyze each of the vehicle driver profiles stored on the storage unit 116 of the vehicle 102 to determine vehicle dynamic data associated with each of the designated customary vehicle drivers.

In particular, the residual value determinant module 140 may determine the number of miles driven by each of the designated customary vehicle drivers and may thereby analyze particular types of vehicle dynamic data including, but not limited to, mileage data, speed data, acceleration data, RPM data, braking pressure data, braking rate data, steering angle data, turn signal usage data associated with each of the designated customary vehicle drivers.

The method 400 may proceed to block 404, wherein the method 400 may include comparing particular vehicle dynamics against particular vehicle dynamic threshold values. In one embodiment, the residual value determinant module 140 may be configured to communicate with the external server 108 to access the residual value repository 130. As discussed above, the residual value repository 130 is configured to store a full residual value of the vehicle 102 and may be further updated by one or more external factors such as, but not limited to, the market value of the model and model year of the vehicle 102, the availability of the model and model year of the vehicle 102, accident history of the vehicle 102, environmental factors that may affect the residual value of the vehicle 102, and additional economic trends that may affect the residual value of the vehicle 102. The residual value repository may also be configured to be updated to store non-static vehicle dynamic threshold values that pertain to various types of vehicle dynamic categories (e.g., miles driven, speed, braking, steering angle) that may categorize a driving style of the vehicle 102 based on a numeric value (e.g., 1-10) that may designate the vehicle 102 as being lightly/softly driven to heavily/severely driven.

In one embodiment, the residual value determinant module 140 may thereby obtain the non-static vehicle dynamic threshold values from the residual value repository 130 and may thereby compare respective vehicle dynamics retrieved from the driving profile to the non-static vehicle dynamic threshold values. Such a comparison may thereby allow the module 140 to thereby categorize the driving style of the vehicle 102 which may thereby be utilized to calculate and process the residual value of the vehicle 102.

The method 400 may proceed to block 406, wherein the method 400 may include calculating a residual value amount based on the vehicle dynamics and one or more external factors. In one embodiment, the residual value determinant module 140 may communicate with the external server 108 to retrieve one or more external factors that may affect the residual value of the vehicle 102, including, but not limited to, the market value of the model and model year of the vehicle 102, the availability of the model and model year of the vehicle 102, accident history of the vehicle 102, environmental factors that may affect the residual value of the vehicle 102, and additional economic trends that may affect the residual value of the vehicle 102. Upon accessing the one or more external factors that may affect the residual value of the vehicle 102, the residual value determinant module 140 may calculate a baseline residual value of the vehicle 102 based on the one or more external factors.

In one embodiment, upon calculating the baseline residual value of the vehicle 102, the residual value determinant module 140 may evaluate the categorization of the driving style of the vehicle 102 to thereby calculate a dynamic based residual value of the vehicle 102 from the baseline residual value of the vehicle 102. In one or more embodiments, the dynamic based residual value may be calculated according to the severity of the driving style of the vehicle 102. Accordingly, the residual value determinant module 140 may apply a higher residual depreciation of the vehicle 102 when the driving style of the vehicle 102 is categorized as more severe, and may apply a lower residual depreciation or a residual appreciation (based on the external factors) when the driving style of the vehicle 102 is categorized as light.

The method 400 may proceed to block 408, wherein the method 400 may include analyzing vehicle location data associated with each driver. In one embodiment, the residual value determinant module 140 may analyze each of the vehicle driver profiles stored on the storage unit 116 of the vehicle 102 to determine vehicle location data associated with each of the designated customary vehicle drivers. In particular, the residual value determinant module 140 may analyze the vehicle location data to determine one or more particular geo-positional locations in which the vehicle 102 may be regularly visited and/or parked over the driving duration of the vehicle 102 associated with each of the customary vehicle drivers.

The method 400 may proceed to block 410, wherein the method 400 may include determining locational attributes associated with one or more locations at which the vehicle is regularly driven/parked for each driver of the vehicle 102. In one embodiment, upon determining the one or more particular geo-positional locations in which the vehicle 102 may be regularly visited and/or parked, the residual value determinant module 140 may communicate with the storage unit 116 to access the map database 124. As discussed above, the map database 124 may include one or more locational attributes associated with one or more particular geo-positional locations. The one or more locational attributes may include, but may not be limited to, crime statistics in a particular geo-location, environmental data in a particular geo-location, point-of-interest data of a particular location, and the like.

In one embodiment, the residual value determinant module 140 may evaluate the locational attributes associated with the one or more particular geo-positional locations in which the vehicle 102 may be regularly visited and/or parked over the driving duration of each of the customary vehicle drivers to thereby calculate a residual depreciation and/or residual appreciation of the vehicle 102 based on the one or more locational attributes. For example, if the vehicle 102 is determined to be regularly driven within and/or regularly parked at a particular location that is associated with high crime statistics and/or inclement snow and ice (e.g., that correspond to salted roads) by a particular customary vehicle driver, the residual value determinant module 140 may calculate a higher amount of residual depreciation that may apply to the residual value of the vehicle 102.

The method 400 may proceed to block 412, wherein the method 400 may include updating the dynamic based residual value of the vehicle 102 based on the determined locational attributes. In an exemplary embodiment, the residual value determinant module 140 may aggregate the residual depreciation or the residual appreciation amount (determined at block 410) with the dynamic based residual value of the vehicle 102 to thereby update the dynamic based residual value.

In particular, the residual value determinant module 140 may electronically process and calculate the residual value of the vehicle 102 for each customary vehicle driver based on the aggregation of the dynamic based residual value and the residual depreciation or the residual appreciation amount as determined based on the determined locational attributes (at block 410). The residual value determinant module 140 may thereby output one or more residual values (e.g., dollar based values) of the vehicle 102 that may apply to one or more points in time during the lifecycle of the vehicle 102.

In some embodiments, the residual value determinant module 140 may determine if the residual value of the vehicle 102 changes above a predetermined amount (e.g., more than 5%) within a span of a predetermined period of time (e.g., within a span of three months) and may communicate data pertaining to the one or more residual values of the vehicle 102 to the driver pattern change determinant module 138. The driver pattern change determinant module 138 may analyze the change in residual value and may thereby execute the process steps of block 316 of the method 300 to thereby determine if there is a change in vehicle dynamic data and/or vehicle location data that is above a predetermined change threshold(s) to thereby determine if the module 138 is to designate a new customary vehicle driver.

In an alternate embodiment, if the residual value determinant module 140 determines that the residual value of the vehicle 102 changes above a predetermined amount (e.g., more than 5%) within a span of a predetermined period of time (e.g., within a span of three months) and communicates respective data pertaining to the driver pattern change determinant module 138, the module 138 may automatically designate a new customary vehicle driver. The driver pattern change determinant module 138 may thereby communicate respective data to the driver profile creation module 134 to thereby execute the method 200 to create a driver profile associated with the newly designated customary vehicle driver.

Figure 5:
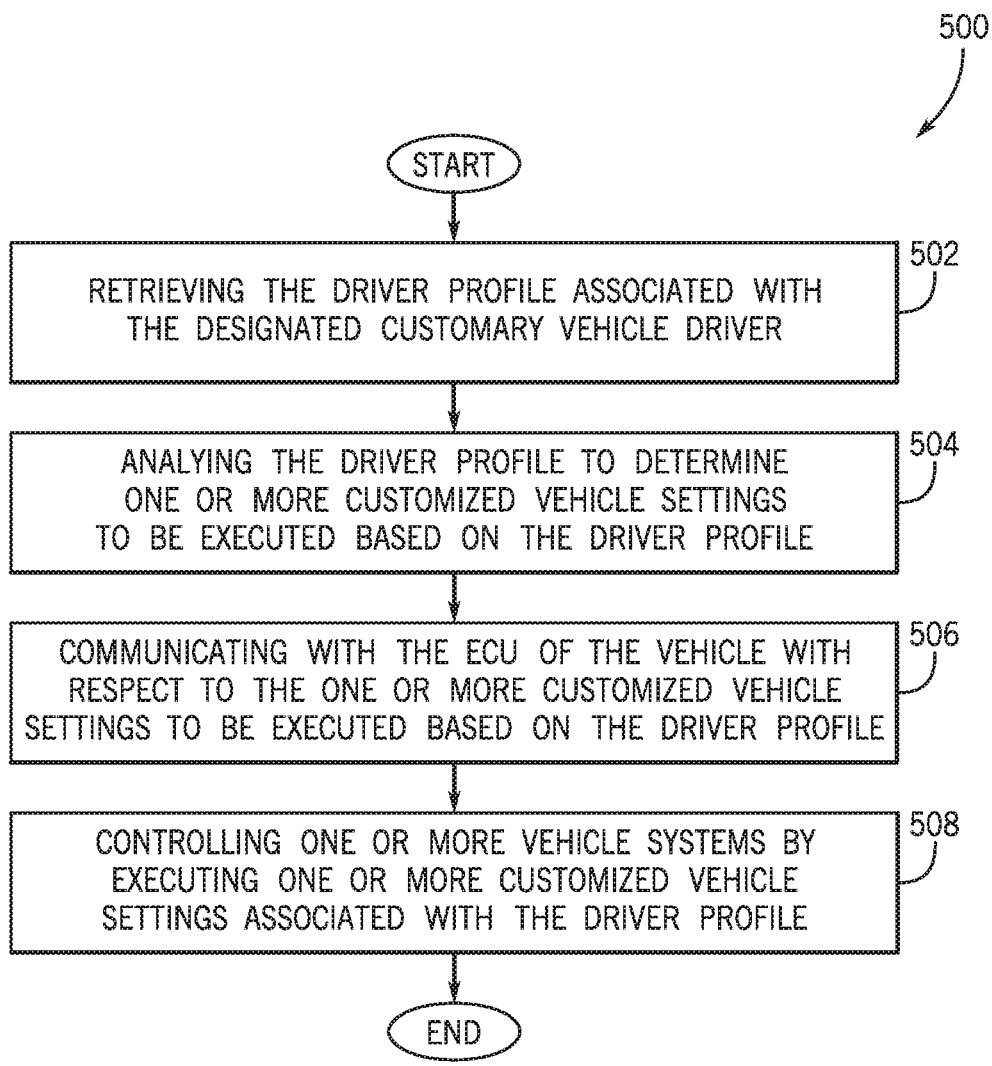
FIG. 5 is a process flow diagram of a method for controlling one or more of the vehicle systems by executing one or more vehicle settings associated with a designated customary vehicle driver according to an exemplary embodiment of the present disclosure.

FIG. 5 is a process flow diagram of a method 500 for controlling one or more of the vehicle systems 112 by executing one or more vehicle settings associated with a designated customary vehicle driver according to an exemplary embodiment of the present disclosure. FIG. 5 will be described with reference to the components of FIG. 1, though it is to be appreciated that the method 500 of FIG. 5 may be used with other systems/components. The method 500 may be executed upon the designation of a customary vehicle driver based on a respective communication by the driver pattern change determinant module 138 to a vehicle settings execution module 142 of the driver/value determination application 104.

The method 500 may begin at block 502, wherein the method 500 may include retrieving the driver profile associated with the designated customary vehicle driver. In an exemplary embodiment, upon receiving the communication from the driver pattern change determinant module 138 regarding the designation of the customary vehicle driver, the vehicle settings execution module 142 may access the storage unit 116 of the vehicle 102 and query the storage unit 116 to retrieve the data profile associated with the designated customary vehicle driver.

In some configurations, the vehicle settings execution module 142 may query the storage unit 116 for the driver settings profile based on the designated customary vehicle driver's name and/or identification information. In additional configurations, the vehicle settings execution module 142 may query the storage unit 116 for the driver settings profile based on the designated customary vehicle driver's information received from the communication unit 110 of the vehicle 102 based on a wireless connection between the vehicle 102 and the mobile device(s) used by the customary vehicle driver.

The method 500 may proceed to block 504, wherein the method 500 may include analyzing the driver profile to determine one or more customized vehicle settings to be executed based on the driver profile. As discussed above, the driver profile may be populated with one or more customized vehicle settings based on inputs received by the driver through the vehicle settings customization user interface (discussed above at block 206 of FIG. 2). In one embodiment, upon retrieving the driver profile associated with the designated customary vehicle driver (at block 502), the vehicle settings execution module 142 may analyze the driver profile to determine one or more customized vehicle settings that have been previously inputted by the driver, as discussed above.

The method 500 may proceed to block 506, wherein the method 500 may include communicating with the ECU 114 of the vehicle 102 with respect to the one or more customized vehicle settings to be executed based on the driver profile. In an exemplary embodiment, upon analyzing the driver profile associated with the designated vehicle driver (at block 504), the vehicle settings execution module 142 may communicate the one or more customized vehicle settings to the ECU 114 of the vehicle 102 in order to thereby send one or more execution signals to one or more of the respective vehicle systems 112.

The method 500 may proceed to block 508, wherein the method 500 may include controlling one or more vehicle systems by executing one or more customized vehicle settings associated with the driver profile. In one embodiment, upon receiving the communication regarding the one or more customized vehicle settings from the vehicle settings execution module 142, the ECU 114 may send one or more execution (data) signals to one or more respective vehicle systems 112 to operably control one or more of the vehicle systems 112 to execute the one or more vehicle settings in accordance with the driver's inputs (at block 208 of FIG. 2). Accordingly, one or more of the vehicle systems 112 may thereby be controlled to provide the customized vehicle settings upon the driver approaching, entering, occupying, and/or driving the vehicle 102.

In an alternate embodiment, if the driver does not choose to input identification/contact information and/or one or more customized vehicle settings based on an incomplete or non-existent driver profile, the vehicle settings execution module 142 may implement the default vehicle settings profile. As discussed above, the default vehicle settings profile may include one or more default vehicle settings that may be executed by one or more of the vehicle systems 112 when the application 104 determines that the customary vehicle driver is not specifically identified and/or has not provided customization inputs pertaining to one or more customized vehicle settings. Accordingly, the vehicle settings execution module 142 may send respective data to the ECU 114 in order to operably control one or more of the vehicle systems 112 to provide default vehicle settings upon the driver approaching, entering, occupying, and/or driving the vehicle 102.

In an exemplary embodiment, if the driver profile associated with the designated customary vehicle driver does include identification/contact information, the vehicle settings execution module 142 may send respective data to the vehicular alert engine 132 of the external server 108. The vehicular alert engine 132 may thereby utilize the identification/contact information to provide (communicate) one or more vehicle updates that may include, but may not be limited to recall information, warranty information, manufacturer updates, hardware updates, software updates, vehicle residual value information, and the like to be received by the customary vehicle driver. This functionality may ensure that the current customary vehicle driver (e.g., owner, primary driver) of the vehicle 102 is kept abreast of any and all vehicle updates that may be related to the vehicle 102.

Figure 6:
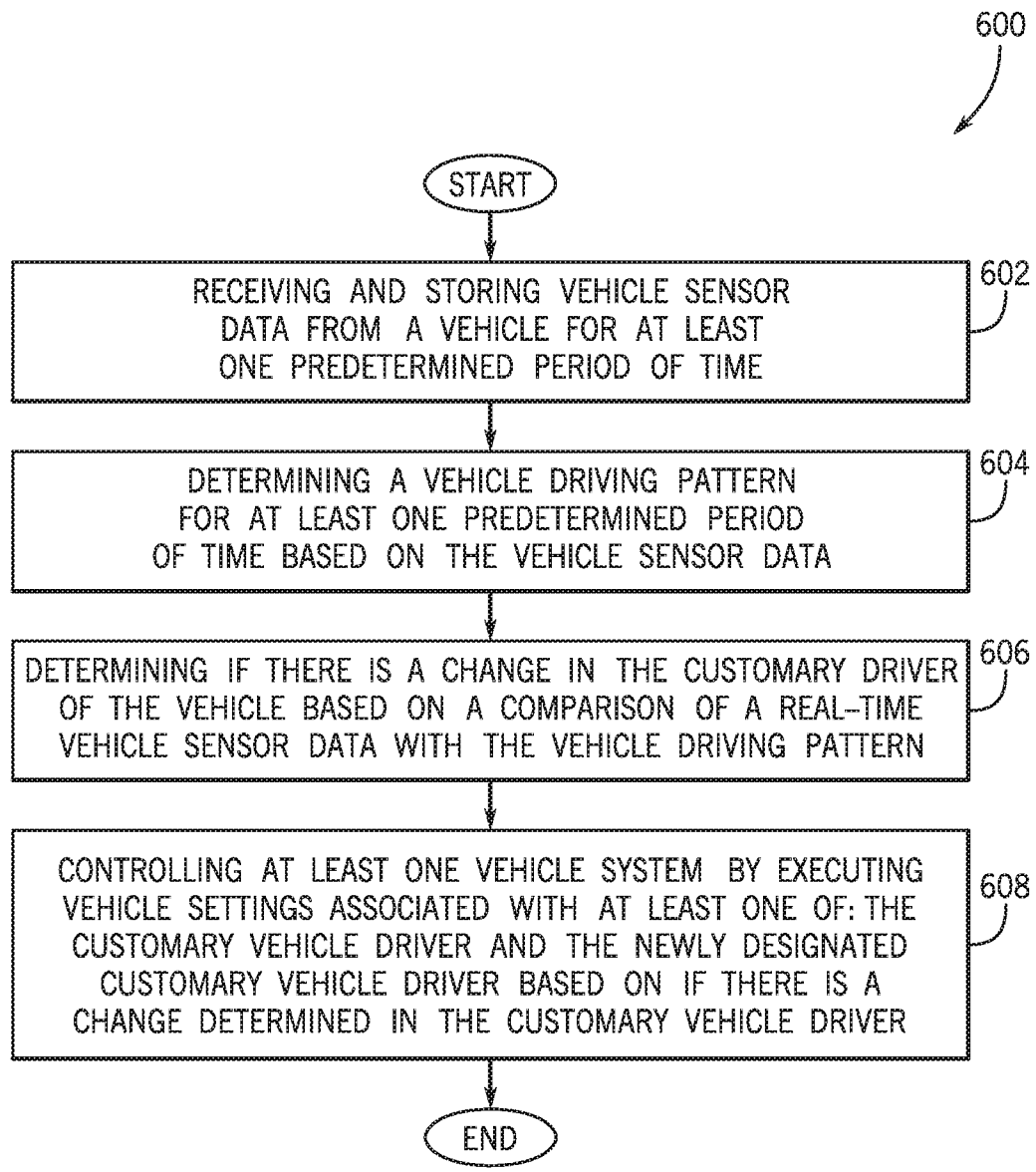
FIG. 6 is a process flow diagram of a method for determining a change of a customary vehicle driver according to an exemplary embodiment of the present disclosure.

FIG. 6 is a process flow diagram of a method 600 for determining a change of a customary vehicle driver according to an exemplary embodiment of the present disclosure. FIG. 6 will be described with reference to the components of FIG. 1, though it is to be appreciated that the method 600 of FIG. 6 may be used with other systems/components. The method 600 may begin at block 602, wherein the method 600 may include receiving and storing vehicle sensor data from a vehicle 102 for at least one predetermined period of time.

The method 600 may proceed to block 604, wherein the method 600 may include determining a vehicle driving pattern for the at least one predetermined period of time based on the vehicle sensor data. In one embodiment, the customary vehicle driver is determined based on the vehicle driving pattern. The method 600 may proceed to block 606, wherein the method 600 may include determining if there is a change in the customary vehicle driver based on a comparison of a real-time vehicle sensor data with the vehicle driving pattern.

In one embodiment, a different driver than the customary vehicle driver is designated as a newly designated customary vehicle driver if the change is determined. The method 600 may proceed to block 608, wherein the method 600 may include controlling at least one vehicle system 112 by executing vehicle settings associated with at least one of: the customary vehicle driver and the newly designated customary vehicle driver based on if the change is determined in the customary vehicle driver.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for electronically determining a residual value of a vehicle that is associated with a vehicle driver of the vehicle, comprising:

electronically receiving and storing vehicle sensor data from the vehicle for at least one predetermined period of time to a vehicle trip log stored upon an electronic storage unit of the vehicle, wherein the vehicle sensor data includes vehicle dynamic data associated with each trip of the vehicle and vehicle location data associated with a plurality of geo-positional locations of the vehicle;

electronically accessing the vehicle trip log to analyze the stored vehicle sensor data to determine a vehicle dynamic data pattern, wherein the vehicle dynamic data pattern pertains to vehicle dynamics that are captured during different phases of driving of the vehicle that are based on an environment in which the vehicle is driven;

electronically determining driving trends that are respectively expressed during different phases of driving of the vehicle for a plurality of vehicle dynamic categories and electronically aggregating driving trend data points that are associated with the driving trends to output the vehicle dynamic data pattern that is associated with a current driver of the vehicle, wherein the current driver of the vehicle includes a first driver or an additional driver;

electronically accessing a map database that is stored upon the electronic storage unit of the vehicle and is updated with locational attributes that are associated with a second plurality of geo-positional locations, wherein the map database is updated with the locational attributes through a connection to at least one third-party that provides the locational attributes to update the map database;

electronically querying the map database with the vehicle location data that is determined from the vehicle sensor data to determine a vehicle locational data pattern that is associated with the current driver of the vehicle that includes the locational attributes associated with the plurality of geo-positional locations of the vehicle, wherein the locational attributes include crime statistics, environmental data, and point-of-interest data that pertain to the plurality of geo-positional locations of the vehicle during the at least one predetermined period of time to calculate at least one of: a residual depreciation and a residual appreciation of the vehicle for the at least one predetermined period of time;

electronically determining a vehicle driving pattern that is associated with the current driver of the vehicle, wherein the vehicle dynamic data pattern and the vehicle locational data pattern that are associated with the current driver of the vehicle are retrieved and data points that are captured during at least one particular timeframe are aggregated to determine and output the vehicle driving pattern that is associated with the current driver of the vehicle;

electronically determining a dynamic based residual value of the vehicle that is based on vehicle dynamic operation of the vehicle during the at least one predetermined period of time;

electronically determining residual values of the vehicle that apply to respective points in time during a lifecycle of the vehicle and are specifically associated with the first driver and the additional driver, wherein the residual values of the vehicle are determined based on an aggregation of the dynamic based residual value and at least one of: the residual depreciation of the vehicle and the residual appreciation of the vehicle;

executing electronically processed instructions to present a human machine interface to enable electronic creation of a driver profile as an electronic data file that is associated with the current driver of the vehicle:

executing electronically processed instructions to electronically populate the driver profile with vehicle settings data;

comparing real time vehicle sensor data with the vehicle driving pattern:

electronically executing the electronic data file by an electronic control unit of the vehicle; and electronically controlling at least one vehicle system to electronically execute vehicle settings associated with the current driver of the vehicle based on the comparison of the real time vehicle sensor data with the vehicle driving pattern.

2. The computer-implemented method of claim 1, wherein the vehicle sensor data includes the vehicle dynamic data captured by vehicle dynamic sensors of the vehicle and the vehicle location data captured by vehicle GPS sensors of the vehicle.

3. The computer-implemented method of claim 2, wherein the driving trends expressed during different phases of driving of the vehicle includes miles driven during different phases of driving of the vehicle, an average speed of the vehicle during different phases of driving the vehicle, an average acceleration rate of the vehicle during different phases of driving the vehicle, and an average braking rate of the vehicle during the different pahases of driving of the vehicle, wherein the current driver of the vehicle includes at least one of: the first driver and the additional driver.

4. The computer-implemented method of claim 3, wherein determining the vehicle driving pattern includes analyzing the vehicle location data for the at least one predetermined period of time and collecting geo-positional parameters that pertains to geo-positional locations during each trip of the vehicle for the predetermined period of time.

5. The computer-implemented method of claim 4, wherein determining the vehicle driving pattern includes analyzing the geo-positional locations during each trip of the vehicle and determining locational timing trends that correspond to locations traveled to by the vehicle and timings of trips to the locations traveled to by the vehicle to determine and output the vehicle locational data pattern that is associated with the current driver of the vehicle.

6. The computer-implemented method of claim 5, wherein determining the vehicle driving pattern includes aggregating the vehicle dynamic data pattern and the vehicle locational data pattern to determine and output the vehicle driving pattern that is associated with the current driver of the vehicle.

7. The computer-implemented method of claim 6, further including determining if there is the change in the vehicle dynamic data and the vehicle location data from the vehicle driving pattern that is above at least one predetermined change threshold based on real-time vehicle dynamic data and real-time vehicle location data, designed the additional driver as the current driver of the vehicle if it is determined that there is a change in the vehicle dynamic data and the vehicle location data from the vehicle driving pattern that is associated with the first driver that is above the at least one predetermined change threshold, and designated the first driver as the current driver of the vehicle if it is determined that there is a change in the vehicle dynamic data and the vehicle location data from the vehicle driving pattern that is associated with the additional driver that is above the at least one predetermined change threshold.

8. The computer-implemented method of claim 1, wherein the residual value of the vehicle is based on the vehicle dynamic data, a baseline residual value of the vehicle, and at least one external factor associated with the vehicle including at least one of a market availability of a model of the vehicle, and a model year of the vehicle, wherein the vehicle dynamic data is compared against at least one vehicle dynamic threshold that pertains to at least one vehicle dynamic category to categorize a driving style of the vehicle to determine the dynamic based residual value of the vehicle.

9. The computer-implemented method of claim 8, wherein the locational attributes that are associated with at least one location at which the vehicle travels are analyzed to calculate at least one of: the residual depreciation of the vehicle that is associated with the current driver of the vehicle and the residual appreciation of the vehicle that is associated with the current driver of the vehicle.

10. A system for electronically determining a residual value of a vehicle that is associated with a vehicle driver of the vehicle, comprising:
 a processor and a memory storing instructions which are executed by the processor and cause the processor to:
 electronically receive and store vehicle sensor data from the vehicle for at least one predetermined period of time to a vehicle trip log stored upon an electronic storage unit of the vehicle, wherein the vehicle sensor data includes vehicle dynamic data associated with each trip of the vehicle and vehicle location data associated with a plurality of geo-positional locations of the vehicle;
 electronically access the vehicle trip log to analyze the stored vehicle sensor data to determine a vehicle dynamic data pattern, wherein the vehicle dynamic data pattern pertains to vehicle dynamics that are captured during different phases of driving of the vehicle that are based on an environment in which the vehicle is driven;
 electronically determine driving trends that are respectively expressed during different phases of driving of the vehicle for a plurality of vehicle dynamic categories and electronically aggregate driving trend data points that are associated with the driving trends to output the vehicle dynamic data pattern that is associated with a current driver of the vehicle, wherein the current driver of the vehicle includes a first driver or an additional driver;
 electronically access a map database that is stored upon the electronic storage unit of the vehicle and is updated with locational attributes that are associated with a second plurality of geo-positional locations, wherein the map database is updated with the locational attributes through a connection to at least one third-party that provides the locational attributes to update the map database;
 electronically query the map database with the vehicle location data that is determined from the vehicle sensor data to determine a vehicle locational data pattern that is associated with the current driver of the vehicle that includes the locational attributes associated with the plurality of geo-positional locations of the vehicle, wherein the locational attributes include crime statistics, environmental data, and point-of-interest data that pertain to the plurality of geo-positional locations of the vehicle during the at least one predetermined period of time to calculate at least one of: a residual depreciation and a residual appreciation of the vehicle for the at least one predetermined period of time;
 electronically determine a vehicle driving pattern that is associated with the current driver of the vehicle, wherein the vehicle dynamic data pattern and the vehicle locational data pattern that are associated with the current driver of the vehicle are retrieved and data points that are captured during at least one particular timeframe are aggregated to determine and output the vehicle driving pattern that is associated with the current driver of the vehicle;
 electronically determine a dynamic based residual value of the vehicle that is based on vehicle dynamic operation of the vehicle during the at least one predetermined period of time;
 electronically determine residual values of the vehicle that apply to respective points in time during a lifecycle of the vehicle and are specifically associated with the first driver and the additional driver, wherein the residual values of the vehicle are determined based on an aggregation of the dynamic based residual value and at least one of: the residual depreciation of the vehicle and the residual appreciation of the vehicle;
 execute electronically processed instructions to present a human machine interface to enable electronic creation of a driver profile as an electronic data file that is associated with the current driver of the vehicle;

execute electronically processed instructions to electronically populate the driver profile with vehicle settings data;

compare real time vehicle sensor data with the vehicle driving pattern;

electronically execute the electronic data file; and electronically control the at least one vehicle system to electronically execute vehicle settings associated with the current driver of the vehicle based on the comparison of the real time vehicle sensor data with the vehicle driving pattern.

11. The system of claim 10, wherein the vehicle sensor data includes the vehicle dynamic data captured by vehicle dynamic sensors of the vehicle and the vehicle location data captured by vehicle GPS sensors of the vehicle.

12. The system of claim 11, wherein the driving trends expressed during the different phases of driving of the vehicle include miles driven during different phases of driving of the vehicle, an average speed of the vehicle during different phases of driving the vehicle, an average acceleration rate of the vehicle during different phases of driving the vehicle, and an average braking rate of the vehicle during the different phases of driving of the vehicle, wherein the current driver of the vehicle includes at least one of: the first driver and the additional driver.

13. The system of claim 12, wherein determining the vehicle driving pattern includes analyzing the vehicle location data for the at least one predetermined period of time and collecting geo-positional parameters that pertains to geo-positional locations during each trip of the vehicle for the predetermined period of time.

14. The system of claim 13, wherein determining the vehicle driving pattern includes analyzing the geo-positional locations during each trip of the vehicle and determining locational timing trends that correspond to locations traveled to by the vehicle and timings of trips to the locations traveled to by the vehicle to determine and output a vehicle locational data pattern that is associated with the current driver of the vehicle.

15. The system of claim 14, wherein determining the vehicle driving pattern includes aggregating the vehicle dynamic data pattern and the vehicle locational data pattern to determine and output the vehicle driving pattern that is associated with the current driver of the vehicle.

16. The system of claim 15, wherein the instructions cause the processor to further determine if there is the change in the vehicle dynamic data and the vehicle location data from the vehicle driving pattern that is above at least one predetermined change threshold based on real-time vehicle dynamic data and real-time vehicle location data, designate the additional driver as the current driver of the vehicle if it is determined that there is a change in the vehicle dynamic data and the vehicle location data from the vehicle driving pattern that is associated with the first driver that is above the at least one predetermined change threshold, and designated the first driver as the current driver of the vehicle if it is determined that there is a change in the vehicle dynamic data and the vehicle location data from the vehicle driving pattern that is associated with the additional driver that is above the at least one predetermined change threshold.

17. The system of claim 10, wherein the residual value of the vehicle is based on the vehicle dynamic data, a baseline residual value of the vehicle, and at least one external factor associated with the vehicle, wherein the at least one external factor associated with the vehicle including at least one of a market availability of a model of the vehicle, and a model year of the vehicle, wherein the vehicle dynamic data is compared against at least one vehicle dynamic threshold that pertains to at least one vehicle dynamic category to categorize a driving style of the vehicle to determine the dynamic based residual value of the vehicle.

18. The system of claim 17, wherein locational attributes that are associated with at least one location at which the vehicle travels are analyzed to calculate at least one of: the residual depreciation of the vehicle that is associated with the current driver of the vehicle and the residual appreciation of the vehicle that is associated with the current driver of the vehicle.

19. A non-transitory computer readable storage medium storing instructions that when executed by a processor, cause the processor to perform a method, the method comprising:

electronically receiving and storing vehicle sensor data from a vehicle for at least one predetermined period of time to a vehicle trip log stored upon an electronic storage unit of the vehicle, wherein the vehicle sensor data includes vehicle dynamic data associated with each trip of the vehicle and vehicle location data associated with a plurality of geo-positional locations of the vehicle, electronically accessing the vehicle trip log to analyze the stored vehicle sensor data to determine a vehicle dynamic data pattern, wherein the vehicle dynamic data pattern pertains to vehicle dynamics that are captured during different phases of driving of the vehicle that are based on an environment in which the vehicle is driven;

electronically determining driving trends that are respectively expressed during different phases of driving of the vehicle for a plurality of vehicle dynamic categories and electronically aggregating driving trend data points that are associated with the driving trends to output the vehicle dynamic data pattern that is associated with a current driver of the vehicle, wherein the current driver of the vehicle includes a first driver or an additional driver;

electronically accessing a map database that is stored upon the electronic storage unit of the vehicle and is updated with locational attributes that are associated with a second plurality of geo-positional locations, wherein the map database is updated with the locational attributes through a connection to at least one third-party that provides the locational attributes to update the map database;

electronically querying the map database with the vehicle location data that is determined from the vehicle sensor data to determine a vehicle locational data pattern that is associated with the current driver of the vehicle that includes the locational attributes associated with the plurality of geo-positional locations of the vehicle, wherein the locational attributes include crime statistics, environmental data, and point-of-interest data that pertain to the plurality of geo-positional locations of the vehicle during the at least one predetermined period of time to calculate at least one of: a residual depreciation and a residual appreciation of the vehicle for the at least one predetermined period of time;

electronically determining a vehicle driving pattern that is associated with the current driver of the vehicle, wherein the vehicle dynamic data pattern and the vehicle locational data pattern that are associated with the current driver of the vehicle are retrieved and data points that are captured during at least one particular timeframe are aggregated to determine and output the vehicle driving pattern that is associated with the current driver of the vehicle;

electronically determining a dynamic based residual value of the vehicle that is based on vehicle dynamic operation of the vehicle during the at least one predetermined period of time;

electronically determining residual values of the vehicle that apply to respective points in time during a lifecycle of the vehicle and are specifically associated with the first driver and the additional driver, wherein the residual values of the vehicle are determined based on an aggregation of the dynamic based residual value and at least one of: the residual depreciation of the vehicle and the residual appreciation of the vehicle;

executing electronically processed instructions to present a human machine interface to enable electronic creation of a driver profile as an electronic data file that is associated with the current driver of the vehicle;

executing electronically processed instructions to electronically populate the driver profile with vehicle settings data;

comparing real time vehicle sensor data with the vehicle driving pattern;

electronically executing the electronic data file; and electronically controlling at least one vehicle system to electronically execute vehicle settings associated with the current driver of the vehicle based on the comparison of the real time vehicle sensor data with the vehicle driving pattern.

20. The non-transitory computer readable storage medium of claim 19, wherein the method further includes determining at least one residual value of the vehicle based on the vehicle dynamic data, a baseline residual value of the vehicle, and at least one external factor associated with the vehicle, including at least one of a market availability of a model of the vehicle, and a model year of the vehicle, wherein the vehicle dynamic data is compared against at least one vehicle dynamic threshold that pertains to at least one vehicle dynamic category to categorize a driving style of the vehicle to determine the dynamic based residual value of the vehicle.

* * * * *